United States Patent
Keating

(10) Patent No.: US 8,113,448 B2
(45) Date of Patent: *Feb. 14, 2012

(54) METHODS OF RECYCLING CARPET COMPONENTS AND CARPET COMPONENTS FORMED THEREFROM

(76) Inventor: Joseph Z. Keating, Lilburn, GA (US)

(*) Notice: Subject to any disclaimer, the term of this patent is extended or adjusted under 35 U.S.C. 154(b) by 398 days.

This patent is subject to a terminal disclaimer.

(21) Appl. No.: 12/427,782

(22) Filed: Apr. 22, 2009

(65) Prior Publication Data

US 2010/0272995 A1  Oct. 28, 2010

(51) Int. Cl.
B02C 19/00 (2006.01)
(52) U.S. Cl. ........ 241/22; 241/29; 241/81; 241/DIG. 38
(58) Field of Classification Search .................. 428/402; 241/22, 29, 14, DIG. 38, 81
See application file for complete search history.

(56) References Cited

U.S. PATENT DOCUMENTS

| | | | |
|---|---|---|---|
| 4,028,159 A | 6/1977 | Norris | |
| 4,103,519 A | 8/1978 | Davidson | |
| 4,106,896 A | 8/1978 | Norris et al. | |
| 4,270,283 A | 6/1981 | Ellis | |
| 4,282,705 A | 8/1981 | Fontan | |
| 4,418,433 A | 12/1983 | Moreland et al. | |
| 4,586,208 A | 5/1986 | Trevarthen | |
| 4,637,942 A | 1/1987 | Tomarin | |
| 4,700,719 A | 10/1987 | Sheahan | |
| 4,730,432 A | 3/1988 | Schafer et al. | |
| 5,033,747 A | 7/1991 | Young | |
| 5,080,112 A | 1/1992 | Brackmanne et al. | |
| 5,169,870 A | 12/1992 | Corbin et al. | |
| 5,185,380 A | 2/1993 | Dressel et al. | |
| 5,191,692 A | 3/1993 | Paione | |
| 5,240,530 A | 8/1993 | Fink | |
| 5,359,061 A | 10/1994 | Evans et al. | |
| 5,433,761 A | 7/1995 | Teague et al. | |
| 5,433,769 A | 7/1995 | Teague et al. | |
| 5,456,872 A | 10/1995 | Ahrweiler | |
| 5,457,197 A | 10/1995 | Sifniades et al. | |
| 5,472,763 A | 12/1995 | Schwarz et al. | |
| 5,494,723 A | 2/1996 | Erren et al. | |
| 5,497,979 A | 3/1996 | Sharer | |
| 5,500,980 A | 3/1996 | Morrow et al. | |
| 5,518,188 A | 5/1996 | Sharer | |
| 5,525,153 A | 6/1996 | Cosola | |
| 5,538,776 A | 7/1996 | Corbin et al. | |
| 5,578,357 A | 11/1996 | Fink | |
| 5,598,980 A | 2/1997 | Dilly-Louis et al. | |
| 5,604,009 A | 2/1997 | Long et al. | |
| 5,656,757 A | 8/1997 | Jenczewski et al. | |
| 5,681,952 A | 10/1997 | Sifniades et al. | |
| 5,684,052 A | 11/1997 | Krishnan et al. | |
| 5,704,104 A | 1/1998 | Bacon et al. | |
| 5,719,198 A | 2/1998 | Young et al. | |
| 5,724,783 A | 3/1998 | Mandish | |
| 5,725,926 A | 3/1998 | Wang | |
| 5,728,444 A | 3/1998 | Fink | |
| 5,728,741 A | 3/1998 | Zegler et al. | |
| 5,770,632 A | 6/1998 | Sekhar et al. | |
| 5,859,071 A | 1/1999 | Young et al. | |
| 5,876,827 A | 3/1999 | Fink et al. | |
| 5,891,198 A | 4/1999 | Pearlstein | |
| 5,895,611 A | 4/1999 | Geltinger et al. | |
| 5,908,701 A | 6/1999 | Jennings et al. | |

(Continued)

Primary Examiner — Mark Rosenbaum
(74) Attorney, Agent, or Firm — Withers & Keys, LLC

(57) ABSTRACT

Methods of recycling carpet components are disclosed. Usable compositions containing recycled carpet components, and carpets and carpet components containing recycled carpet components are also disclosed.

15 Claims, 1 Drawing Sheet

U.S. PATENT DOCUMENTS

| | | | |
|---|---|---|---|
| 5,914,353 A | 6/1999 | Grizzler et al. |
| 5,916,410 A | 6/1999 | Moens |
| 5,929,234 A | 7/1999 | Sifniades et al. |
| 5,943,829 A | 8/1999 | Wilson |
| 5,977,193 A | 11/1999 | Corbin et al. |
| 6,020,486 A | 2/2000 | Booij et al. |
| 6,029,916 A | 2/2000 | White |
| 6,036,726 A | 3/2000 | Yang et al. |
| 6,039,903 A | 3/2000 | Kent et al. |
| 6,051,300 A | 4/2000 | Fink |
| 6,059,207 A | 5/2000 | Costello et al. |
| 6,111,099 A | 8/2000 | Frentzen et al. |
| 6,155,020 A | 12/2000 | Deem |
| 6,182,913 B1 | 2/2001 | Howe et al. |
| 6,196,435 B1 | 3/2001 | Wu |
| 6,211,275 B1 | 4/2001 | Xanthos et al. |
| 6,241,168 B1 | 6/2001 | Young et al. |
| 6,250,575 B1 | 6/2001 | White |
| 6,271,270 B1 | 8/2001 | Muzzy et al. |
| 6,274,637 B1 | 8/2001 | Schallenberg |
| 6,291,048 B1 | 9/2001 | Jerdee et al. |
| 6,299,691 B1 | 10/2001 | Pelzer |
| 6,316,075 B1 | 11/2001 | Desai et al. |
| 6,332,253 B1 | 12/2001 | Rasnick, Jr. et al. |
| 6,341,462 B2 | 1/2002 | Kiik et al. |
| 6,379,489 B1 | 4/2002 | Goulet et al. |
| 6,387,967 B2 | 5/2002 | Muzzy et al. |
| 6,392,037 B1 | 5/2002 | Agterberg et al. |
| 6,524,653 B1 | 2/2003 | Jones |
| 6,562,119 B2 | 5/2003 | Jones, IV et al. |
| 6,582,816 B2 | 6/2003 | Rasnick, Jr. et al. |
| 6,610,769 B1 | 8/2003 | Blahpain et al. |
| 6,682,671 B1 | 1/2004 | Howell et al. |
| 6,756,412 B2 | 6/2004 | Muzzy |
| 6,763,637 B2 | 7/2004 | Pelosi, Jr. |
| 6,786,988 B1 | 9/2004 | Bell |
| 6,814,826 B1 | 11/2004 | Bell |
| 6,828,372 B2 | 12/2004 | Sullivan et al. |
| 6,860,953 B1 | 3/2005 | Grizzle et al. |
| 6,936,201 B2 | 8/2005 | Desai et al. |
| 6,945,007 B2 | 9/2005 | Kobayashi et al. |
| 6,953,119 B1 | 10/2005 | Wening |
| 6,990,703 B2 | 1/2006 | Brown et al. |
| 7,045,590 B2 | 5/2006 | Bell |
| 7,064,092 B2 | 6/2006 | Hutchison et al. |
| 7,066,532 B2 | 6/2006 | Schoemann |
| 7,097,723 B2 | 8/2006 | Allison et al. |
| 7,105,069 B2 | 9/2006 | Allison et al. |
| 7,129,347 B2 | 10/2006 | Kampf et al. |
| 7,160,599 B2 | 1/2007 | Hartman |
| 7,235,293 B2 | 6/2007 | Dailey |
| 7,244,333 B2 | 7/2007 | Hutchison et al. |
| 7,252,691 B2 | 8/2007 | Philipson |
| 7,272,870 B2 | 9/2007 | Pierce et al. |
| 7,279,065 B1 | 10/2007 | Ogle et al. |
| 7,338,698 B1 | 3/2008 | Bieser et al. |
| 7,351,465 B2 | 4/2008 | Jerder et al. |
| 7,357,971 B2 | 4/2008 | Bieser et al. |
| 7,361,401 B2 | 4/2008 | Desai |
| 7,419,058 B2 | 9/2008 | Wening |
| 7,517,426 B2 | 4/2009 | Mano et al. |
| 2006/0134374 A1 | 6/2006 | Bell et al. |

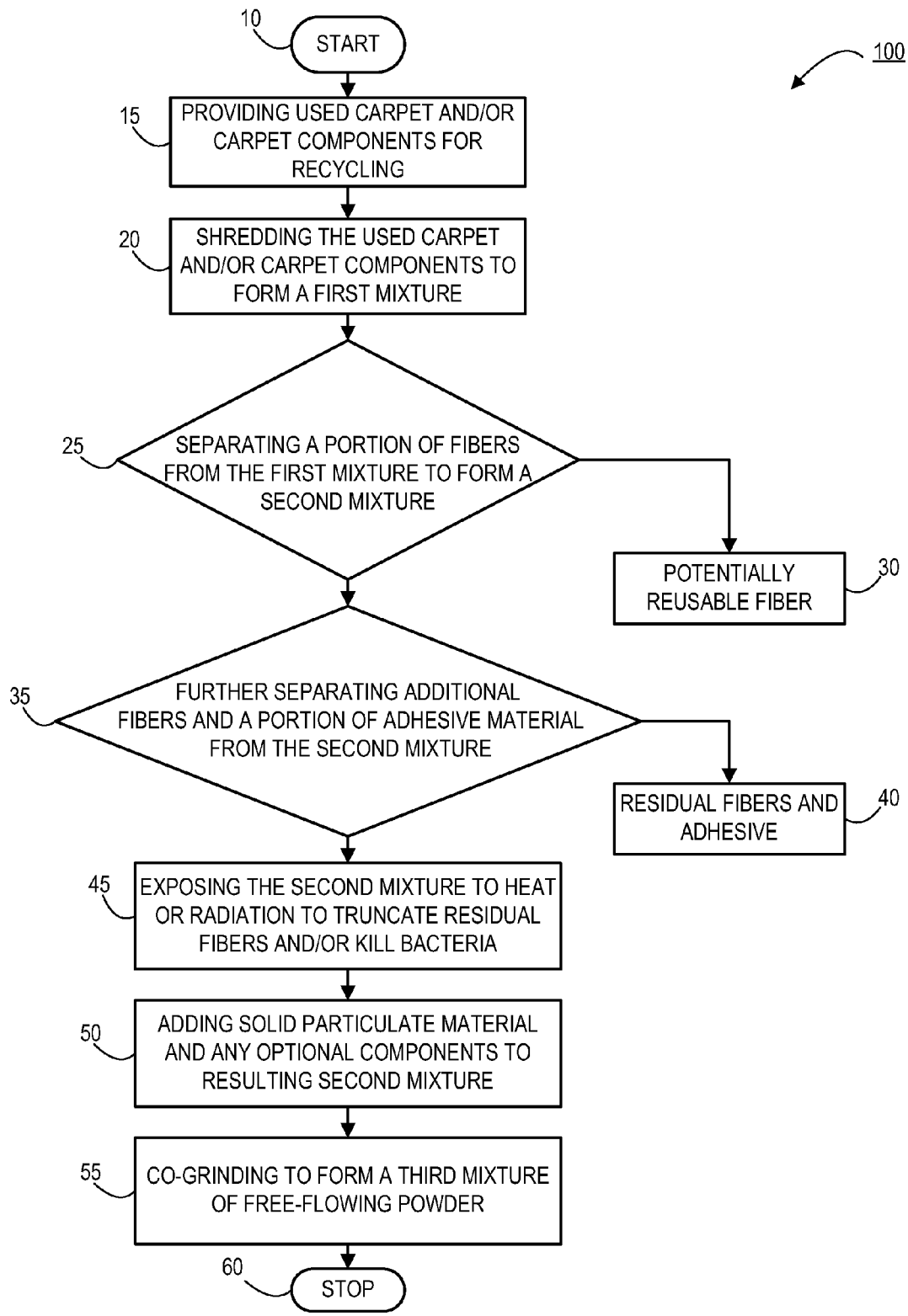

METHODS OF RECYCLING CARPET COMPONENTS AND CARPET COMPONENTS FORMED THEREFROM

TECHNICAL FIELD

The present invention relates to methods of recycling carpet components, usable compositions containing recycled carpet components, and new carpets and carpet components containing recycled carpet components.

BACKGROUND

Efforts continue to further develop ways to effectively and efficiently recycle carpet components.

SUMMARY

The present invention continues the effort to further develop ways to effectively and efficiently recycle carpet components by the discovery of methods of recycling carpet components previously destined for landfills. The methods of the present invention enable the formation of a free-flowing powder from a tacky first mixture of used carpet components. The resulting free-flowing powder has substantially no tackiness and is suitable for incorporation into new carpet components such as a new carpet backing or a new carpet adhesive component.

Accordingly, the present invention is directed to methods of recycling carpet components. In one exemplary embodiment, the method of recycling carpet components comprises separating at least a portion of fibers from a first mixture of carpet components comprising carpet fibers, a carpet adhesive component, and used filler material so as to form a second mixture comprising residual carpet fibers, the carpet adhesive component, and the used filler material; and co-grinding the second mixture with a solid inorganic particulate material, wherein said co-grinding step results in a third mixture comprising a free-flowing powder having an average particle size. Typically, the free-flowing powder has an average particle size of less than 50 microns ($\mu m$), and a particle size range of from about 1.0 $\mu m$ to about 300 $\mu m$.

The present invention is further directed to the free-flowing powder resulting from the disclosed methods of recycling carpet components. In one exemplary embodiment, the free-flowing powder comprises (i) particles of recycled carpet material, the recycled carpet material comprising residual carpet fibers or carpet fiber portions, a carpet adhesive component, and used filler material; and (ii) solid inorganic particulate material, the solid inorganic particulate material being from a source other than recycled carpet material; wherein the free-flowing powder has a particle size ranging from about 1.0 to about 300 microns ($\mu m$). Typically, the free-flowing powder has an average particle size of less than 50 $\mu m$.

The present invention is even further directed to carpet components comprising the free-flowing powder resulting from the disclosed methods of recycling carpet components. In one exemplary embodiment, the carpet component comprises free-flowing powder, wherein the free-flowing powder comprises (i) particles of recycled carpet material, the recycled carpet material comprising residual carpet fibers or carpet fiber portions, a carpet adhesive component, and used filler material; and (ii) solid inorganic particulate material, the solid inorganic particulate material being from a source other than recycled carpet material; wherein the free-flowing powder has a particle size ranging from about 1.0 to about 300 microns ($\mu m$). The carpet component may further comprise one or more additional components such as a polymeric matrix material, a latex component, carpet fibers, or any combination thereof.

These and other features and advantages of the present invention will become apparent after a review of the following detailed description of the disclosed embodiments and the appended claims.

BRIEF DESCRIPTION OF THE FIGURE

The present invention is further described with reference to the appended FIGURE, wherein:

FIG. 1 depicts a flow diagram of an exemplary method of recycling carpet components according to the present invention.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to methods of recycling carpet components. The present invention is further directed to the free-flowing powder resulting from the disclosed methods of recycling carpet components. The present invention is even further directed to carpet components comprising the free-flowing powder resulting from the disclosed methods of recycling carpet components.

In one exemplary embodiment, the method of recycling carpet components comprises separating at least a portion of fibers from a first mixture of carpet components comprising carpet fibers, a carpet adhesive component, and used filler material so as to form a second mixture comprising residual carpet fibers, the carpet adhesive component, and the used filler material; and co-grinding the second mixture with a solid inorganic particulate material, wherein said co-grinding step results in a third mixture comprising a free-flowing powder having an average particle size. An exemplary first mixture of carpet components comprises from about 40 to about 60 wt % of the carpet fibers; from about 5.0 to about 20 wt % of the adhesive component; and from about 15 to about 40 wt % of the used filler material; wherein all weight percentages are based on a total weight of the first mixture.

Prior to processing, the first mixture comprises a tacky, conglomerating mixture that alone is incapable of being ground into a free-flowing powder due to the tackiness of the carpet adhesive component (e.g., a latex binder) within the first mixture. The method of the present invention enables the tacky first mixture to be converted into a free-flowing powder by separating at least a portion of fibers from the first mixture, and co-grinding solid inorganic particulate material with the tacky second mixture (i.e., the first mixture minus a portion of carpet fibers within the first mixture). The co-grinding step results in a free-flowing powder, wherein at least a portion of the free-flowing powder comprises particles comprising (i) a portion of the carpet adhesive component at least partially surrounded by (ii) a portion of the solid inorganic particulate material.

The separating step may comprise any separation step that removes at least a portion of carpet fibers from the tacky first mixture. Suitable separation steps include, but are not limited to, one or more screening steps, one or more gravity separation steps, one or more air classification steps, or any combination thereof. In some desired embodiments, the separation step comprises processing the first mixture through one or more screening steps utilizing, for example, one or more screens having a screen mesh size ranging from about 10 to about 80 mesh (e.g., a sieve opening size of from about 0.18 to about 2.0 millimeters (mm)).

In the co-grinding step, an effective amount of solid inorganic particulate material is co-ground with the second mixture in order to form a free-flowing powder. The co-grinding step may comprise processing the second mixture through one or more grinding mills such as one or more hammer mills, one or more ball mills, one or more roller mills, or any combination thereof.

Typically, solid inorganic particulate material is added to the second mixture so as to form a third mixture, wherein the third mixture comprises from about 10 to about 90 weight percent (wt %) of the second mixture, and from about 90 to about 10 weight percent (wt %) of the solid inorganic particulate material. In more desired embodiments, solid inorganic particulate material is added to the second mixture so as to form a third mixture, wherein the third mixture comprises from about 20 to about 80 weight percent (wt %) of the second mixture, and from about 80 to about 20 weight percent (wt %) of the solid inorganic particulate material.

Suitable solid inorganic particulate material for use in the present invention includes, but is not limited to, (i) new filler material selected from calcium carbonate, limestone, alumina trihydrate, brucite (i.e., magnesium hydroxide), feldspar, dolomite, silica, clay, or any combination thereof; (ii) post industrial filler material selected from fly ash, glass (e.g., e-glass), and any combination thereof; (iii) post consumer filler material comprising post consumer glass, recycled paper, and any combination thereof; or (iv) any combination of any of (i), (ii) and (iii). In some exemplary embodiments, the solid inorganic particulate material comprises calcium carbonate and/or limestone. In some exemplary embodiments, the solid inorganic particulate material comprises post consumer glass (e.g., ground glass) from post consumer glass sources such as beverage containers, vehicle windshields, fluorescent lights, other post consumer glass containers (e.g., jars), or any combination thereof.

In place of or in addition to the co-grinding step, any one or combination of the above-mentioned solid inorganic particulate materials may be added to the second mixture so as to form the third mixture. For example, any one or combination of the above-mentioned solid inorganic particulate materials may be simply added to and blended with the second mixture to form the third mixture. In other embodiments, any one or combination of the above-mentioned solid inorganic particulate materials may be added to and co-grinded with the second mixture to form the third mixture. In other embodiments, a first portion of any one or combination of the above-mentioned solid inorganic particulate materials may be added to and co-grinded with the second mixture, and a second portion of any one or combination of the above-mentioned solid inorganic particulate materials may be added to and blended with the resulting co-ground composition to form the third mixture.

The resulting free-flowing powder typically has an average particle size that ranges from about 1.0 to about 50 microns (μm) (or from about 1.0 to about 40 μm, or from about 1.0 to about 30 μm). Further, the resulting free-flowing powder typically has a particle size ranging from about 1.0 to about 300 microns (μm) (or from about 1.0 to about 250 μm, or from about 1.0 to about 200 μm, or from about 1.0 to about 150 μm, or from about 1.0 to about 100 μm, or from about 1.0 to about 50 μm).

An exemplary method of recycling carpet components according to the present invention is depicted in FIG. 1. As shown in FIG. 1, exemplary method of recycling 100 comprises start 10 followed by step 15, wherein used carpet and/or carpet components are provided for recycling. From step 15, exemplary method 100 proceeds to step 20, wherein used carpet and/or carpet components are shredded to form a first mixture. From step 20, exemplary method 100 proceeds to first separation step 25, wherein a portion of carpet fibers are separated from and removed from the first mixture to form a second mixture.

The removed carpet fibers are shown in box 30 of exemplary method 100. It should be noted that the removed carpet fibers are potentially reusable fibers for carpet applications or other possible uses. Typically, from about 40 to about 60 wt % of the first mixture is recovered as potentially reusable fibers, while about 60 to about 40 wt % of the first mixture remains as the second mixture.

As shown in FIG. 1, from step 20, exemplary method 100 proceeds to second separation step 35, wherein additional residual fibers and a portion of the adhesive material is separated from and removed from the second mixture. The removed additional residual fibers and portion of the adhesive material are shown in box 40 of exemplary method 100. Typically, from about 1.0 to about 30 wt % of the second mixture is removed during step 35 in the form of additional residual fibers and a portion of adhesive material, for example, any adhesive material having a particle size greater than about 4.7 millimeters (mm) (i.e., using a 4 mesh screen). The remaining 99 to 70 wt % of the second mixture proceeds to step 45 of exemplary method 100.

It should be noted that second separation step 35 is not necessary in all embodiments of the present invention. In other words, second separation step 35 is an optional step in some of the methods of the present invention.

In step 45, the second mixture is exposed to heat and/or radiation to truncate the residual fibers and/or kill any bacteria/fungi (collectively referred to as "microorganisms") present in the second mixture. Typically, when exposed, the second mixture is exposed to a temperature of from about 100 to about 250° C. or UV light for a time period ranging from about 20 to about 200 seconds.

It should be noted that exposure step 45 is not necessary in all embodiments of the present invention. In other words, exposure step 45 is an optional step in some of the methods of the present invention.

As shown in FIG. 1, from optional exposure step 45, exemplary method 100 proceeds to step 50, wherein solid particulate material is added to the second mixture. Any of the above-mentioned solid particulate materials may be added to the second mixture at this time. It should be noted that other optional components may also be added to the second mixture during this step (or during a subsequent addition step (not shown)). Other optional components that may also be added to the second mixture include, but are not limited to, a biocide, organic flow agents (e.g., propylene or ethylene glycol or triethanolamine), or any combination thereof.

From step 55, exemplary method 100 proceeds to step 55, wherein the second mixture, solid particulate material, and any other optional components are co-ground with one another to produce a third mixture comprising a free-flowing powder having a desired particle size. As noted above, typically, the resulting free-flowing powder has an average particle size of less than 50 μm. In some embodiments, the resulting free-flowing powder has an average particle size ranging from about 15 to about 40 μm. In other embodiments, the resulting free-flowing powder has an average particle size ranging from about 5 to about 30 μm.

In some embodiments, the resulting free-flowing powder contains greater than 10 wt % of post consumer content (e.g., post consumer glass, recycled paper, etc.). Desirably, the resulting free-flowing powder contains from about 10 to about 90 wt % of post consumer content.

It should be understood that steps 50 and 55 may occur substantially simultaneously. In other words, the second mixture, solid particulate material and any other optional components may be simultaneously added, from one or more sources, directly into a co-grinding apparatus as oppose to mixing/blending prior to advancing to the co-grinding apparatus.

As shown in FIG. 1, from step 55, exemplary method 100 proceeds to stop box 60. Although not shown in FIG. 1, exemplary methods of recycling carpet and/or carpet components, such as exemplary method 100, may further comprise additional process steps as discussed herein.

The methods of recycling carpet components in accordance with the present invention may further comprise incorporating the free-flowing powder into a new carpet component. For example, the free-flowing powder may be incorporated into a new carpet backing, a new carpet adhesive component, a polyethylene, a polyvinyl chloride, a plastisol, a urethane, a SBR (i.e., styrene-butadiene rubber) latex, a vinyl acetate latex, or any combination thereof. Further, the methods of recycling carpet components in accordance with the present invention may further comprise one or more additional method steps including, but not limited to, offering for sale the free-flowing powder, and offering for sale a new carpet component comprising the free-flowing powder.

The present invention is further directed to the free-flowing powder resulting from the disclosed methods of recycling carpet components. Typically, the free-flowing powder comprises (i) particles of recycled carpet material, the recycled carpet material comprising residual carpet fibers or carpet fiber portions, a carpet adhesive component, and used filler material; and (ii) solid inorganic particulate material, the solid inorganic particulate material being from a source other than recycled carpet material; wherein the free-flowing powder has an average particle size ranging from about 1.0 to about 50 microns (μm) (or from about 1.0 to about 40 μm, or from about 1.0 to about 30 μm), and a particle size ranging from about 1.0 to about 300 microns (μm) (or from about 1.0 to about 250 μm, or from about 1.0 to about 200 μm, or from about 1.0 to about 150 μm, or from about 1.0 to about 100 μm, or from about 1.0 to about 50 μm). As discussed above, typically, at least a portion of the free-flowing powder comprises particles comprising (i) a portion of the carpet adhesive component at least partially surrounded by (ii) a portion of the solid inorganic particulate material.

Further, as discussed above, the free-flowing powder resulting from the disclosed methods of recycling carpet components comprises from about 10 to about 90 weight percent (wt %) of the second mixture (i.e., recycled carpet components), and from about 90 to about 10 weight percent (wt %) of the solid inorganic particulate material (e.g., post consumer filler material). In more desired embodiments, the free-flowing powder resulting from the disclosed methods of recycling carpet components comprises from about 20 to about 80 wt % of the second mixture (i.e., recycled carpet components), and from about 80 to about 20 wt % of the solid inorganic particulate material (e.g., post consumer filler material).

The present invention is even further directed to new carpet components comprising the free-flowing powder resulting from the disclosed methods of recycling carpet components. In one exemplary embodiment, the new carpet component comprises free-flowing powder, wherein the free-flowing powder comprises (i) particles of recycled carpet material, the recycled carpet material comprising residual carpet fibers or carpet fiber portions, a carpet adhesive component, and used filler material; and (ii) solid inorganic particulate material, the solid inorganic particulate material being from a source other than recycled carpet material. As discussed above, the free-flowing powder within the new carpet component has an average particle size ranging from about 1.0 to about 50 microns (μm) (or from about 1.0 to about 40 μm, or from about 1.0 to about 30 μm), and a particle size ranging from about 1.0 to about 300 microns (μm) (or from about 1.0 to about 250 μm, or from about 1.0 to about 200 μm, or from about 1.0 to about 150 μm, or from about 1.0 to about 100 μm, or from about 1.0 to about 50 μm).

The new carpet component desirably comprises at least about 10 wt % of post consumer filler material, such as the exemplary post consumer filler material described above. In some embodiments, the new carpet component comprises at least about 12 wt % (or at least about 14 wt %, or at least about 16 wt %, or at least about 18 wt %, or at least about 20 wt %, or greater than about 20 wt %) of post consumer filler material, such as the exemplary post consumer filler material described above, in combination with the second mixture as described above. Suitable new carpet components include, but are not limited to, a new carpet backing, a new carpet adhesive component, and/or any other material used to form a new carpet component.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of recycling carpet components, said method comprising:
 separating at least a portion of fibers from a first mixture of carpet components comprising carpet fibers, a carpet adhesive component, and used filler material so as to form a second mixture comprising residual carpet fibers, the carpet adhesive component, and the used filler material; and
 co-grinding the second mixture with a solid inorganic particulate material, wherein said co-grinding step results in a third mixture comprising a free-flowing powder having an average particle size.

2. The method of claim 1, wherein at least a portion of the free-flowing powder comprises particles comprising (i) a portion of the carpet adhesive component at least partially surrounded by (ii) a portion of the solid inorganic particulate material.

3. The method of claim 1, wherein the average particle size of the third mixture ranges from about 1.0 to about 50 microns (μm).

4. The method of claim 1, wherein the third mixture comprises particles having a particle size ranging from about 1.0 to about 300 microns (μm).

5. The method of claim 1, wherein the third mixture comprises from about 10 to about 90 weight percent (wt %) of the second mixture, and from about 90 to about 10 weight percent (wt %) of the solid inorganic particulate material.

6. The method of claim 1, wherein the third mixture comprises from about 20 to about 80 weight percent (wt %) of the second mixture, and from about 80 to about 20 weight percent (wt %) of the solid inorganic particulate material.

7. The method of claim 1, wherein the solid inorganic particulate material comprises (i) new filler material selected from calcium carbonate, limestone, alumina trihydrate, brucite, feldspar, dolomite, silica, or any combination thereof; (ii) post industrial filler material selected from fly ash, glass, and any combination thereof; (iii) post consumer filler material comprising post consumer glass; or (iv) any combination of any of (i), (ii) and (iii).

8. The method of claim 7, wherein the solid inorganic particulate material comprises calcium carbonate, limestone, or a combination thereof.

9. The method of claim 7, wherein the solid inorganic particulate material comprises post consumer glass.

10. The method of claim 1, wherein said separating step comprises:
processing the first mixture through one or more screens having a screen mesh size ranging from about 10 to about 80 mesh.

11. The method of claim 1, wherein said co-grinding step comprises:
processing the second mixture and the solid inorganic particulate material through one or more grinding mills.

12. The method of claim 1, wherein the first mixture comprises:
from about 40 to about 60 wt % of the carpet fibers;
from about 5 to about 20 wt % of the adhesive component; and
from about 15 to about 40 wt % of the used filler material;
wherein all weight percentages are based on a total weight of the first mixture.

13. The method of claim 1, further comprising:
incorporating the free-flowing powder into a new carpet component.

14. The method of claim 13, wherein the new carpet component comprises a new carpet backing, a new carpet adhesive component, or a combination thereof.

15. The method of claim 1, further comprising:
offering for sale the free-flowing powder.

* * * * *